US008014815B2

(12) United States Patent  (10) Patent No.: US 8,014,815 B2
Karabinis  (45) Date of Patent: Sep. 6, 2011

(54) RADIOTERMINALS INCLUDING SATELLITE INTERLOCKS AND RELATED METHODS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 12/902,449

(22) Filed: Oct. 12, 2010

(65) Prior Publication Data

US 2011/0028188 A1  Feb. 3, 2011

Related U.S. Application Data

(62) Division of application No. 12/266,822, filed on Nov. 7, 2008, which is a division of application No. 11/094,931, filed on Mar. 31, 2005, now Pat. No. 7,606,590.

(60) Provisional application No. 60/560,221, filed on Apr. 7, 2004.

(51) Int. Cl.
  *H04B 7/00* (2006.01)
(52) U.S. Cl. ... 455/522; 455/12.1; 455/13.4; 455/552.1; 455/140
(58) Field of Classification Search .......... 455/571, 455/522, 69, 569, 12.1, 13.4, 427, 430, 323, 455/456, 515, 500, 552.1, 62, 557, 13.1, 455/553.1, 563, 575.1, 575.9, 90.3, 344, 455/345, 556.1, 140
See application file for complete search history.

(56) References Cited

U.S. PATENT DOCUMENTS

| | | | |
|---|---|---|---|
| 4,901,307 | A | 2/1990 | Gilhousen et al. |
| 5,036,523 | A | 7/1991 | Briskman |
| 5,073,900 | A | 12/1991 | Mallinckrodt |
| 5,303,286 | A | 4/1994 | Wiedeman |
| 5,339,330 | A | 8/1994 | Mallinckrodt |
| 5,394,561 | A | 2/1995 | Freeburg |
| 5,446,756 | A | 8/1995 | Mallinckrodt |
| 5,448,623 | A | 9/1995 | Wiedeman et al. |
| 5,511,233 | A | 4/1996 | Otten |
| 5,555,257 | A | 9/1996 | Dent |
| 5,584,046 | A | 12/1996 | Martinez et al. |
| 5,594,941 | A | 1/1997 | Dent |
| 5,612,703 | A | 3/1997 | Mallinckrodt |
| 5,619,525 | A | 4/1997 | Wiedeman et al. |
| 5,631,898 | A | 5/1997 | Dent |

(Continued)

FOREIGN PATENT DOCUMENTS

DE  101 36 215  2/2003

(Continued)

OTHER PUBLICATIONS

First Chinese Office Action corresponding to CN Patent Application No. 201010118310.5 dated Oct. 13, 2010; 5 pages.

(Continued)

*Primary Examiner* — Tan Trinh
(74) *Attorney, Agent, or Firm* — Myers Bigel Sibley & Sajovec, P.A.

(57) ABSTRACT

A radioterminal may include a transceiver, a hands-free interface, and a satellite/hands-free interlock. The transceiver may be configured for space-based communications and for terrestrial wireless communications. The satellite/hands-free interlock may be configured to prevent the transceiver from transmitting space-based communications unless the hands-free interface is activated. Related methods are also discussed.

6 Claims, 5 Drawing Sheets

U.S. PATENT DOCUMENTS

| | | | |
|---|---|---|---|
| 5,761,605 A | 6/1998 | Tawil et al. | |
| 5,765,098 A | 6/1998 | Bella | |
| 5,768,684 A * | 6/1998 | Grubb et al. | 455/13.4 |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,864,316 A | 1/1999 | Bradley et al. | |
| 5,878,329 A | 3/1999 | Mallinckrodt | |
| 5,884,142 A | 3/1999 | Wiedeman et al. | |
| 5,901,367 A | 5/1999 | Toh | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,966,667 A | 10/1999 | Halloran et al. | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,029,074 A | 2/2000 | Irvin | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,147,981 A | 11/2000 | Prescott | |
| 6,157,811 A | 12/2000 | Dent | |
| 6,157,834 A | 12/2000 | Helm et al. | |
| 6,160,994 A | 12/2000 | Wiedeman | |
| 6,163,677 A | 12/2000 | Natsukawa et al. | |
| 6,169,878 B1 | 1/2001 | Tawil et al. | |
| 6,188,678 B1 | 2/2001 | Prescott | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,542,739 B1 | 4/2003 | Garner | |
| 6,600,929 B1 * | 7/2003 | Toncich et al. | 455/522 |
| 6,628,919 B1 | 9/2003 | Curello et al. | |
| 6,684,057 B2 | 1/2004 | Karabinis | |
| 6,721,538 B1 | 4/2004 | Sullivan et al. | |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| RE40,910 E * | 9/2009 | Aoki et al. | 455/552.1 |
| 7,606,590 B2 | 10/2009 | Karabinis | |
| 7,634,234 B2 | 12/2009 | Karabinis | |
| 2002/0041575 A1 | 4/2002 | Karabinis et al. | |
| 2002/0090942 A1 | 7/2002 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2002/0177476 A1 * | 11/2002 | Chou | 455/574 |
| 2002/0193108 A1 * | 12/2002 | Robinett | 455/427 |
| 2003/0003815 A1 | 1/2003 | Yamada | |
| 2003/0022625 A1 | 1/2003 | Otten et al. | |
| 2003/0032461 A1 | 2/2003 | Desrosiers | |
| 2003/0054760 A1 | 3/2003 | Karabinis | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153267 A1 | 8/2003 | Karabinis | |
| 2003/0153308 A1 | 8/2003 | Karabinis | |
| 2003/0224785 A1 | 12/2003 | Karabinis | |
| 2003/0228875 A1 * | 12/2003 | Alapuranen | 455/522 |
| 2004/0028149 A1 * | 2/2004 | Krafft et al. | 375/316 |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0009563 A1 | 1/2005 | Stenmark | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0153732 A1 | 7/2005 | Stotelmyer et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0255898 A1 | 11/2005 | Huang | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |
| 2009/0088151 A1 | 4/2009 | Karabinis | |

FOREIGN PATENT DOCUMENTS

| | | |
|---|---|---|
| EP | 0 506 255 A2 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 835 033 | 4/1998 |
| EP | 1 059 826 A1 | 12/2000 |
| EP | 1 193 989 A1 | 4/2002 |
| EP | 1 235 374 | 8/2002 |
| JP | 10-224134 A | 8/1998 |
| JP | 2001-211017 A | 3/2001 |
| KR | 10-2005-0054021 | 6/2005 |
| WO | WO 98/29966 | 7/1998 |
| WO | WO 01/54314 A1 | 7/2001 |

| | | |
|---|---|---|
| WO | WO 02/05443 | 1/2002 |
| WO | WO 02/05443 A2 | 1/2002 |
| WO | WO 03/013020 A1 | 2/2003 |

OTHER PUBLICATIONS

Japanese Office Action corresponding to JP Patent Application No. 2007-507414; Drafted: Oct. 13, 2010; Dispatch Date: Oct. 15, 2010.
Athanasios D. Panagopoulos et al; http://www.comsoc,org/livepubs/surveys/public/2004/jul/panagopoulos.html "Satellite Communications at Ku, Ka, and V bands: Propagation Impairments and Mitigation Techniques" IEEE Communications Surveys & Tutorials.
Tarek Attia; http://www.ee.ucl.ac.uk/Ics/papers2000/lcs062.pdf "Satellite Diversity Gain Over the LEOS Channel, Based CDMA Systems".
Ayyagari et al., "A satellite-augmented cellular network concept", *Wireless Networks*, Vo. 4, 1998, pp. 189-198.
Dutta, *Methods of Ground Based Beamforming and On-Board Frequency Translation and Related Systems*, U.S. Appl. No. 60/583,218, filed Jun. 25, 2004.
Global.com, "Globalstar Demonstrates World's First Prototype of Terrestrial System to Supplemental Satellite Phones," http://www.qlobalcomsatphone.com/qlobalcom/qlobalstar_terrestrial_system.html, Jul. 18, 2002, 2 pages.
International Search Report and Written Opinion of the International Searching Authority for International patent application No. PCT/US2005/011407 mailed on Sep. 5, 2005.
Karabinis et al., *Space-Based Networks and Methods With Ground-Based Beam Forming*, U.S. Appl. No. 60/572,164, filed May 18, 2004.
Korean Non-Final Rejection with English translation (19 pages) corresponding to Korean Application No. 10-2006-7020882; Dated Aug. 29, 2008.
John Neuhaus http://www.jneuhaus.com/fccindex/1_band.html Satellite frequency to L-band conversion (Sep. 21, 2002).
Raffaello Tesi et al; http://www.estec.esa.nl/conferences/o1C14/papers/5.G.pdf "Space-Time Coded Satellite Diversity in S-UMTS", DSP2001 Conf. Proc., Oct. 1-3, 2001, Lisben, Portugal.
Lloyd Wood et al; http://www.ee.surrey.ac.uk/Personal/L.Wood/publicatons/Wood-et-al-AIFF-diversity.pdf "Managing diversity with handover to provide classes of service in satellite constellation networks", (ICSSC '01), vol. 3, Session 35, No. 194, Toulouse, France, Apr. 17-20, 2001.
Zheng, *Adaptive Beam-Forming With Interference Suppression and Multi-User Detection in Satellite Systems With Terrestrial Reuse of Frequencies*, U.S. Appl. No. 60/641,560, filed Jan. 5, 2005.
http://www.ictp.trieste.it/~radionet/2001_school/lectures/luther/HTML/develop/sId052.htm Satellite Frequency Bands slide 52 of 76.
http://www.mlesat.com/Article9.html The Battle of the Bands "The Digital Satellite TV Handbook" Mar./Apr. 1997.
http://www.satcoms.org.uk/frequencybands.asp UK Satellite Communication Resources—Radio & Satellite Frequency Bands "Radio & Satellite Frequency Bands", printed Jan. 17, 2005.
http://www.eutelsat.com/satellites/4_2_7_2b.html Frequency bands:: General Information "Frequency bands", printed Jan. 17, 2005.
First Examination Report from the Indian Patent Office corresponding to Indian Patent Application No. 3957/DELNP/2006; Feb. 23, 2009.
Extended European Search Report (4 pages) corresponding to European Application No. 08172618.4; Dated: Jul. 9, 2009.
EPO Communication (6 pages) corresponding to EP. App. No. 08172505.3, dated Feb. 17, 2010.

* cited by examiner

US 8,014,815 B2

RADIOTERMINALS INCLUDING SATELLITE INTERLOCKS AND RELATED METHODS

RELATED APPLICATION

The present application claims the benefit of priority as a divisional of U.S. application Ser. No. 12/266,822, entitled Radioterminals Including Satellite/Hands-Free Interlocks And Related Methods, filed Nov. 7, 2008, which is a divisional of U.S. application Ser. No. 11/094,931, entitled Satellite/Hands-Free Interlock Systems And/Or Companion Devices For Radioterminals And Related Methods, filed Mar. 31, 2005 now U.S. Pat. No. 7,606,590, which claims priority from U.S. Provisional Application Ser. No. 60/560,221, entitled Satellite/Hands-Free Interlock Systems And Methods For Radioterminals, filed Apr. 7, 2004. The disclosures of all of the above referenced patent applications are hereby incorporated herein by reference in their entireties.

FIELD OF THE INVENTION

This invention relates to radioterminal communications systems and methods, and more particularly to terrestrial cellular and satellite cellular radioterminal communications systems and methods.

BACKGROUND OF THE INVENTION

Satellite communications systems and methods are widely used for wireless communications. Satellite communications systems and methods generally employ at least one space-based component, such as one or more satellites, that is/are configured to wirelessly communicate with a plurality of satellite radioterminals.

A satellite radioterminal communications system or method may utilize a single satellite antenna pattern (beam) covering an entire area served by the system. Alternatively, in cellular satellite radioterminal communications systems and methods, multiple antenna patterns (beams or cells) are provided, each of which can serve substantially distinct geographical areas in the overall service region, to collectively serve an overall satellite service footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communications signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space using any frequency or frequencies. A radioterminal also may be referred to herein as a "radiotelephone," "terminal", or "wireless user device".

A terrestrial network can enhance cellular satellite radioterminal system availability, efficiency and/or economic viability by terrestrially using and/or reusing at least some of a frequency band that is allocated to and/or used by a cellular satellite radioterminal system or systems. In particular, it is known that it may be difficult for a cellular satellite radioterminal system to reliably serve densely populated areas, because a satellite signal may be blocked by high-rise structures and/or may not penetrate into buildings. As a result, a satellite spectrum may be underutilized or unutilized in such areas. The terrestrial reuse of at least some of the cellular satellite system frequencies can reduce or eliminate this potential problem.

The capacity of a hybrid system, comprising terrestrial and satellite-based communications connectivity and configured to terrestrially use and/or reuse at least some frequencies of a satellite-band, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit to one or more radioterminal(s) downlink signals received at the satellite telecommunications repeater(s) from a satellite and also receive, amplify and retransmit to the satellite uplink signals received at the satellite telecommunications repeater(s) from one or more radioterminal(s) thereby increasing an effective downlink and uplink margin in the vicinity of the satellite telecommunications repeater(s) and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used for satellite and terrestrial communications, respectively), which can lead to increased cost, size and/or weight of the radioterminal. See U.S. Pat. No. 6,052,560 to the present inventor Karabinis, entitled Satellite System Utilizing a Plurality of Air Interface Standards and Method Employing Same.

U.S. Pat. No. 6,684,057, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. Patent Application Publication No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY

According to embodiments of the present invention, a radioterminal may include a transceiver, a hand-held interface coupled to the transceiver, and an interlock coupled to the transceiver. The transceiver may be configured to transmit and receive wireless communications. More particularly, the transceiver may be configured to transmit high power communications at a power and/or Equivalent Isotropic Radiated Power (EIRP) that is greater than or equal to a high power threshold and/or at a maximum high power and/or EIRP level and to transmit low power communications at a power and/or EIRP that is less than or equal to a low power threshold and/or at a maximum low power and/or EIRP level. In addition, the interlock may be configured to prevent the transceiver from transmitting high power communications at a power and/or EIRP that is greater than or equal to the high power threshold when the hand-held interface is activated. In other embodiments, the interlock may be configured to allow the transceiver to transmit high power communications at a power and/or EIRP that is greater than or equal to the high power threshold when the hand-held interface is activated and is selectively used in a satellite push-to-send mode (i.e., Push-to-Talk (PTT)) and/or data mode. The low power threshold and the high power threshold may be a same power threshold, or the low power threshold may be greater or less than the high power threshold.

More particularly, the hand-held interface may include a built-in speaker configured to provide audio output corresponding to wireless communications received by the transceiver when the hand-held interface is activated. The hand-held interface may also include a built-in display and/or keypad configured to provide data output and/or input corresponding to wireless communications received and/or to be transmitted by the transceiver. The interlock may also be configured to allow the transceiver to transmit low power communications at a power and/or EIRP that is less than or equal to the low power threshold when the hand-held interface is activated.

More particularly, the transceiver may be configured to provide space-based communications and wireless terrestrial communications and to transmit high power communications at a power and/or EIRP that is greater than or equal to the high power threshold for space-based communications and to transmit low power communications at a power and/or EIRP that is less than or equal to the low power threshold or to transmit high power communications at a power and/or EIRP that is greater than or equal to the high power threshold for terrestrial communications. Moreover, the transceiver may include a low power transmission amplifier configured to amplify the low power communications for transmission at a power and/or EIRP that is less than or equal to the low power threshold and a high power transmission amplifier configured to amplify the high power communications for transmission at a power and/or EIRP that is greater than or equal to the high power threshold. Accordingly, the interlock may be configured to disable the high power transmission amplifier when the hand-held interface is activated. In some embodiments, the low power transmission amplifier and the high power transmission amplifier may be the same amplifier that is configured to include a low power transmission mode and a high power transmission mode.

In addition, a hands-free interface may be coupled to the transceiver, and the interlock may be further configured to enable the transceiver to transmit high power communications at a power and/or EIRP that is greater than or equal to the high power threshold when the hands-free interface is activated. The hands-free interface, for example, may include a coupling for a remote earpiece and/or speaker, and the coupling for the remote earpiece and/or speaker may include a tethered and/or an untethered coupling. In addition or in an alternative, the coupling for the remote earpiece and/or speaker may include an interface for a cradle configured to receive the radioterminal and to couple the radioterminal to a remote loudspeaker. In another alternative, the hands-free interface may include a speakerphone interface. In other embodiments, the hand-held interface and/or the radioterminal may include an antenna comprising a radiating element that may be selectively positioned at a distance from the hand-held interface and/or radioterminal and the interlock may be configured to allow the transceiver to transmit low power communications at a power and/or EIRP that is less than or equal to the low power threshold or high power communications at a power and/or EIRP that is greater than or equal to the high power threshold when the radiating element is positioned at substantially a predetermined distance from the hand-held interface and/or radioterminal or positioned at a distance that is greater than the predetermined distance from the hand-held interface and/or radioterminal and low power communications at a power and/or EIRP that is less than or equal to the low power threshold when the radiating element is positioned at a distance from the hand-held interface and/or radioterminal that is substantially less than the predetermined distance.

An interface for a companion transmitting device may be provided wherein the interface is configured to provide the high power communications to the companion transmitting device to transmit the high power communications from the companion transmitting device at a power and/or EIRP that is greater than or equal to the high power threshold when the hand-held interface is activated. The interface comprises a wireless interface and/or a wired interface. The companion transmitting device may be configured to be attached and operatively coupled to the hand-held interface and/or radioterminal and may also be configured to be selectively detachable from the hand-held interface and/or radioterminal and operatively coupled to the hand-held interface and/or radioterminal. In addition, a radioterminal antenna may be coupled to the transceiver, and the companion device may include a companion device antenna. Moreover, a gain of the companion device antenna may be greater than a gain of the radioterminal antenna. In some embodiments, the companion device antenna is configured to radiate substantially circularly polarized electro-magnetic energy and the radioterminal antenna is configured to radiate in a polarization that is substantially the same or different compared to the polarization of electro-magnetic energy that is radiated by the companion device antenna. In addition or in an alternative, the transceiver may include a transmission amplifier inside the radioterminal, and the companion device may include a transmission amplifier outside the radioterminal that may be inside the companion device. Moreover, a power level, such as a maximum power level, of the transmission amplifier outside the radioterminal that may be inside the companion device may be greater than a power level, such as a maximum power level, of the transmission amplifier inside the radioterminal.

A hands-free interface may also be coupled to the transceiver, and the interlock may be configured to provide user notification to activate the hands-free interface responsive to a request to transmit high power communications when the hand-held interface is active. The interlock may also be configured to enable the transceiver to transmit high power communications at a power and/or EIRP that is greater than or equal to the high power threshold responsive to activation of the hands-free interface. In addition, the interlock may be configured to enable the transceiver for a period of time after the request to transmit high power communications and before activation of the hands-free interface when the hand-held interface is activated.

An interface for a companion transmitting device may also be provided, and the interlock may be configured to provide user notification to activate the interface for the companion transmitting device responsive to a request to transmit high power communications when the hand-held interface is active. The interlock may also be configured to provide the high power communications through the interface to the companion transmitting device to transmit the high power communications from the companion transmitting device responsive to activating the interface for the companion transmitting device. The interlock may also be configured to enable the transceiver for a period of time when the hand-held interface is activated after the request to transmit high power communications and before activation of the interface for the companion transmitting device.

According to additional embodiments of the present invention, methods may be provided for operating a radioterminal including a transceiver configured to transmit high power communications at a power and/or EIRP that is greater than or equal to a high power threshold and to transmit low power communications at a power and/or EIRP that is less than or equal to a low power threshold, and including a hand-held interface. More particularly, the method may include allowing the transceiver to transmit low power communications at a power and/or EIRP that is less than or equal to the low power threshold when the hand-held interface is activated. The transceiver may be prevented from transmitting high power communications at a power and/or EIRP that is greater than or equal to the high power threshold when the hand-held interface is activated. The hand-held interface may include a built-in speaker configured to provide audio output adjacent a user's ear corresponding to wireless communications received by the transceiver when the hand-held interface is activated.

The transceiver may be configured to provide space-based communications and wireless terrestrial communications, and the transceiver may be configured to transmit high power communications at a power and/or EIRP that is greater than or equal to the high power threshold for space-based communications and to transmit low power communications at a power and/or EIRP that is less than or equal the low power threshold for terrestrial communications. The transceiver may include a low power transmission amplifier configured to amplify the low power communications and a high power transmission amplifier configured to amplify the high power communications. Accordingly, preventing the transceiver from transmitting high power communications when the hand-held interface is activated may include disabling the high power transmission amplifier when the hand-held interface is activated.

The radioterminal may also include a hands-free interface coupled to the transceiver, and the transceiver may be enabled to transmit high power communications at a power and/or EIRP that is greater than or equal to the high power threshold when the hands-free interface is activated. The hands-free interface may include a coupling for a remote earpiece and/or speaker, and/or a speakerphone interface. The radioterminal may also include an interface for a companion transmitting device and the high power communications may be provided through the interface to the companion transmitting device to be transmitted by the companion transmitting device at a power and/or EIRP that is greater than or equal to the high power threshold when the hand-held interface is activated.

The radioterminal may include a hands-free interface coupled to the transceiver, and user notification to activate the hands-free interface may be provided responsive to a request to transmit high power communications when the hand-held interface is active. The transceiver may be enabled to transmit high power communications at a power and/or EIRP that is greater than or equal to the high power threshold responsive to activation of the hands-free interface. After the request to transmit high power communications and before activation of the hands-free interface, the transceiver may also be enabled for a period of time to transmit high power communications when the hand-held interface is active.

The radioterminal may include an interface for a companion transmitting device that may be remote from the radioterminal, and user notification to activate the interface for the companion transmitting device may be provided responsive to a request to transmit high power communications when the hand-held interface is active. The high power communications may be provided through the interface to the companion transmitting device to be transmitted from the companion transmitting device responsive to activating the interface for the companion transmitting device. In addition, the transceiver may be enabled for a period of time when the hand-held interface is activated after the request to transmit high power communications and before activation of the interface for the companion transmitting device.

According to still additional embodiments of the present invention, a radioterminal may include a transceiver, a hands-free interface, and a satellite/hands-free interlock. The transceiver may be configured for space-based communications and for terrestrial wireless communications, and the satellite/hands-free interlock may be configured to prevent the transceiver from transmitting space-based communications unless the hands-free interface is activated. The hands-free interface, for example, may include a coupling for a remote earpiece and/or a speakerphone interface.

In addition, a hand-held interface may be provided, and the interlock may be further configured to prevent the transceiver from transmitting space-based communications when the hand-held interface is activated. The hand-held interface, for example, may include a built in speaker configured to provide audio output adjacent a user's ear corresponding to wireless communications received by the transceiver when the hand-held interface is activated. Moreover, the satellite/hands-free interlock may be configured to provide user notification to activate the hands-free interface in response to a request to transmit space-based communications when the hand-held interface is activated. The satellite/hands-free interlock may also be configured to enable the transceiver for a period of time after the request to transmit space-based communications without activation of the hands-free interface when the hand-held interface is activated. In addition, the satellite/hands-free interlock may be configured to allow the transceiver to transmit terrestrial communications when the hand-held interface is activated.

According to yet additional embodiments of the present invention, methods may be provided for operating a radioterminal including a transceiver configured for space-based communications and for terrestrial wireless communications, and including a hands-free interface. The method may include allowing the transceiver to transmit terrestrial communications when the hands-free interface is not activated, and preventing the transceiver from transmitting space-based communications unless the hands-free interface is activated. For example, the hands-free interface may include a coupling for a remote earpiece and/or a speakerphone interface.

In addition, the transceiver may be prevented from transmitting space-based communications when a hand-held interface is activated. The hand-held interface, for example, may include a built in speaker configured to provide audio output corresponding to wireless communications received by the transceiver when the hand-held interface is activated. Moreover, user notification to activate the hands-free interface may be provided in response to a request to transmit space-based communications when the hand-held interface is activated. In addition, the transceiver may be enabled for a period of time after the request to transmit space-based communications without activation of the hands-free interface when the hand-held interface is activated. Moreover, the transceiver may be allowed to transmit terrestrial communications when the hand-held interface is activated.

DETAILED DESCRIPTION

Figure 1:
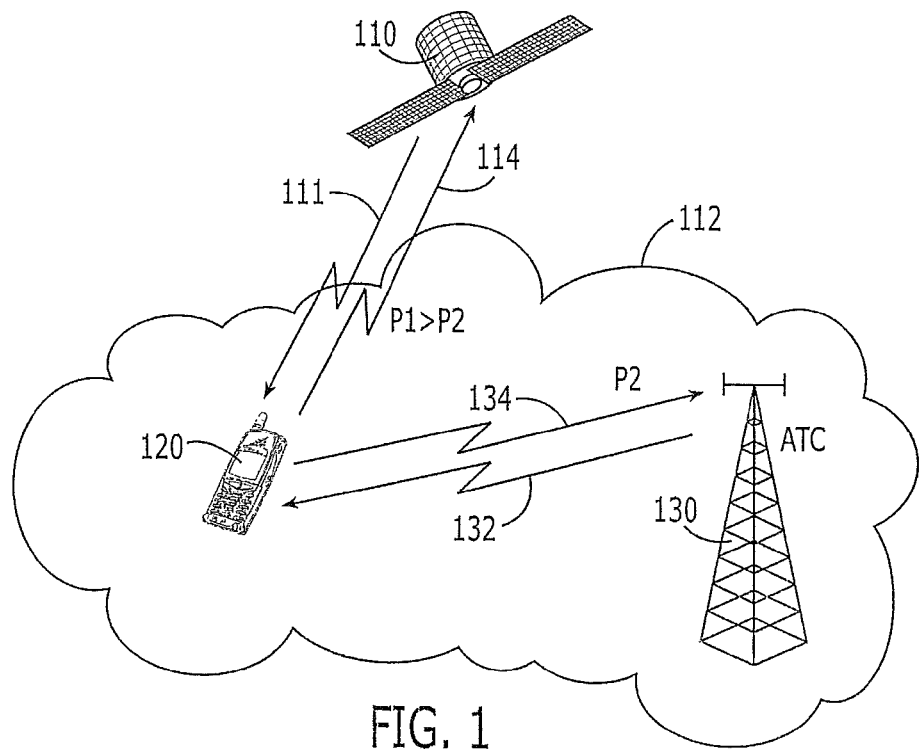
FIG. 1 is a diagram illustrating communications systems according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first, second, third, fourth etc., may be used herein to describe various elements, these elements should not be limited by these terms. These terms are only used to distinguish one element from another element. Thus, for example, a first element below could be termed a second, third or fourth element, and similarly, a second element may be termed a first, third or fourth element etc., without departing from the teachings of the present invention. As used herein, the term "and/or" includes any and all combinations of one or more of the associated listed items. The symbol "/" is also used as a shorthand notation for "and/or". Moreover, as used herein, "substantially the same" band(s) means that one or more bands being discussed/compared substantially overlap, but that there may be some areas of non-overlap, for example, at a band end. Moreover, "substantially the same" air interface (s) means that two or more air interfaces that are being discussed/compared are similar but need not be identical. Some differences may exist between the two or more air interfaces to account, for example, for different characteristics and/or Quality-of-Service (QoS) goals of two or more respective systems, such as, for example, the different characteristic(s) and/or QoS goals between terrestrial and satellite systems. For example, respective different vocoder rates may be used for satellite communications and for terrestrial communications (for example, a 13 or a 16 kbps vocoder rate may be used for terrestrial communications and a 4 or a 2 kbps vocoder rate may be used for satellite communications). In addition, a different forward error correction coding, a different interleaving depth, and/or different spread spectrum codes (e.g. Walsh codes, long codes, and/or frequency hopping codes) may be used for satellite communications compared to respective parameters/quantities/algorithms that may be used for terrestrial communications. Moreover, "substantially the same" bands of frequencies means that the bands of frequencies being compared include a common set of frequencies but some frequencies included in at least one of the bands may be different (non-common). In general, "X and Y are substantially the same" means that X and Y have/share a plurality of identical and/or similar parameters and/or characteristics but X and Y may differ in at least one parameter and/or characteristic.

It will be understood that when an element is referred to as being "connected" or "coupled" to another element, it can be directly connected or coupled to the other element or intervening elements may be present. Furthermore, "connected" or "coupled" as used herein may include wirelessly connected or coupled. The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

FIG. 1 is a schematic diagram of satellite radioterminal communications systems and methods according to embodiments of the present invention. As shown in FIG. 1, a Space-Based Network (SBN) includes one or more Space-Based Components (SBC), such as a satellite 110 that is configured to communicate with a plurality of radioterminals 120 in a satellite footprint 112. An Ancillary Terrestrial Network (ATN) that includes one or more Ancillary Terrestrial Components (ATC) 130 is also configured to communicate with the radioterminals 120. The ancillary terrestrial network may be geographically spaced apart from the satellite footprint and/or may be contained at least partially within the satellite footprint 112. Communications between the satellite(s) 110 and the radioterminals 120 over a satellite forward link 111 and a satellite return link 114, and between the ancillary terrestrial component(s) 130 and the radioterminals 120 over an ancillary terrestrial component forward link 132 and an ancillary terrestrial component return link 134 may be provided using substantially the same satellite frequency band(s) and/or substantially the same air interface(s), in some embodiments of the invention.

In some embodiments of the present invention, the space-based network may employ one or more satellites 110 which may have a relatively small and, therefore, relatively low gain antenna. For example, approximately a six meter diameter antenna, approximately a 9 meter diameter antenna or approximately a 12 meter diameter antenna may be provided on at least one of the satellite(s) 110. As a consequence, the antenna gain and/or power amplifier output level of the satellite/ATC radioterminal 120 may be increased when the radioterminal 120 is communicating with the satellite 110, relative to the antenna gain and/or power amplifier output level of the radioterminal 120 when the radioterminal is communicating with the ancillary terrestrial component 130. Thus, as shown in FIG. 1, the power level P1 transmitted on the satellite return link 114 may be increased to be greater than the power level P2 transmitted on the ancillary terrestrial component return link 134. Stated differently, P1>P2. Since the radioterminal 120 may radiate at a higher Effective Isotropic Radiated Power (EIRP) in satellite mode relative to the radioterminal's EIRP in ATC mode, the radioterminal 120 may not maintain a desired Specific Absorption Rate (SAR) criterion that may be dictated by a regulation and/or safety concern, when evaluated in satellite mode and in accordance with substantially the same operating configuration as in ATC mode (i.e., being held next/proximate/adjacent and/or at a specified distance from a user's head).

Figure 2:
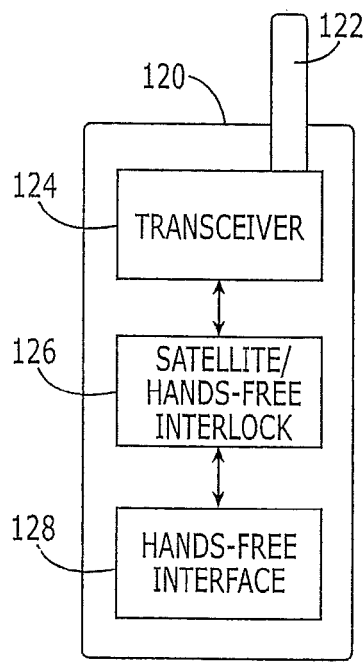
FIG. 2 is a block diagram illustrating radioterminals according to embodiments of the present invention.

Referring now to FIG. 2, some embodiments of the present invention can provide a satellite/ATC radioterminal 120 that includes a satellite/hands-free interlock 126 that is configured to prevent a transceiver 124 and/or antenna 122 of the radioterminal 120 from substantially transmitting in satellite mode unless a hands-free interface 128 of the radioterminal 120 is activated. As is well known to those having skill in the art, a hands-free interface 128 can comprise a tethered earpiece and microphone, a speakerphone interface, a cradle and/or any other conventional tethered and/or untethered hands-free interface. An untethered hands-free interface may use a Bluetooth, WiFi, WiMAX, infrared, ultraviolet and/or other wireless local area (and/or personal area) network communications technique over licensed and/or un-licensed frequencies.

Accordingly, in order to substantially reduce or eliminate the probability that a user will communicate via the satellite 110 while holding the radioterminal 120 in proximity of the user's ear, the radioterminal 120 may be configured such that when it is in the satellite active mode and a communications channel has been allocated to the radioterminal 120 by the satellite system, the radioterminal is rendered unable to substantially transmit unless a hands-free mode is activated on the radioterminal 120.

It will be understood by those having skill in the art that the radioterminal 120 of FIG. 2 may also include other conventional components, including a data processor such as a microprocessor, a digital signal processor, radio frequency components, a man-machine interface and/or other conventional components. The satellite/hands-free interlock 126 may be provided, for example, at least in part, by a stored program running on a data processor that operates, for example, periodically or non-periodically and/or in response to interrupts, in response to the man-machine interface and/or at least one received signal at the radioterminal and/or at least one transmitted signal by the radioterminal. Combinations of software and/or other hardware also may be used to implement the satellite/hands-free interlock 126.

Figure 3:
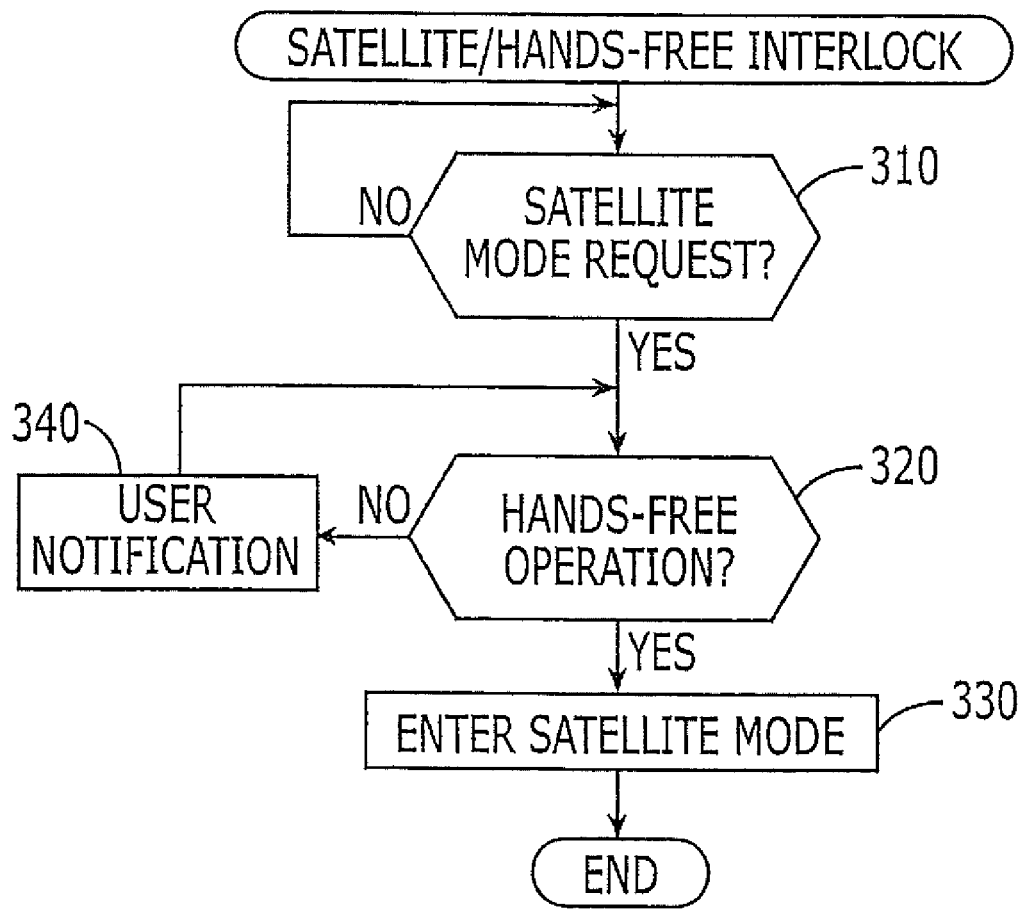
FIG. 3 is a flow chart illustrating operations of radioterminals according to embodiments of the present invention.

FIG. 3 is a flowchart of operations that may be performed to provide a satellite/hands-free interlock, such as the satellite/hands-free interlock 126 of FIG. 2, according to various embodiments of the present invention. Referring to FIG. 3, a determination is made at Block 310 if a satellite mode communications channel request has been made. The satellite mode request may be based on a user radioterminal request to use the satellite mode and/or a system request to use the satellite mode to initiate communications and/or to handover the user radioterminal from ATC mode and/or cellular/PCS mode to satellite mode.

Still referring to FIG. 3, if a satellite mode request is made at Block 310, then at Block 320, a test is made as to whether hands-free operation of the radioterminal is active. Hands-free operation may be detected at Block 320 by, for example, detecting that a tethered and/or un-tethered microphone and/or earpiece have been inserted into an appropriate jack/interface of the radioterminal and/or is/are wirelessly operatively connected to the radioterminal, detecting that the radioterminal has been placed in a cradle, detecting that a wired and/or wireless local area network (and/or personal area network) connection has been made with the radioterminal to enable a hands-free interface with the radioterminal and/or using other techniques for detecting use of a hands-free interface.

If hands-free operation is detected at Block 320, then satellite mode is entered at Block 330 and the radioterminal 120 is enabled to communicate with the satellite 110 by transmitting to the satellite 110 at an appropriately high power and/or EIRP level and/or at a maximum high power and/or EIRP level and/or at an appropriately high (or higher) data rate. Alternatively, if hands-free operation is not detected at Block 320, a user notification may be provided at Block 340. This user notification may be in the form of an audible signal, a signal that may be sensed by a part of a human body that is in contact with the radioterminal (such as a vibration signal) and/or a visual display signal and/or any other type of notification that may be perceptible by a human with or without non-human sensory enhancements. User notifications for various other purposes are well known to those having skill in the art, so that the design of the user notification of Block 340 need not be described in detail herein. After user notification, a test may again be made at Block 320 as to whether hands-free operation is present. Alternatively, the test at Block 320 may not be made again and the satellite mode request at Block 310 may simply be denied. In still other embodiments, user notification of Block 340 may not be performed, and the satellite mode request at Block 310 may simply be denied. In still other embodiments, satellite communications may be provided by the radioterminal and/or by the system for a predetermined interval of time following the satellite mode request even though the radioterminal is not operative in a hands-free mode. During the predetermined interval of time the user may be notified at least once by the radioterminal to enable a hands-free mode. If the radioterminal is placed in hands-free mode during the predetermined interval of time, satellite communications may continue uninterrupted. If the radioterminal is not placed in hands-free mode during the predetermined interval of time, satellite communications may be interrupted.

Figure 4:
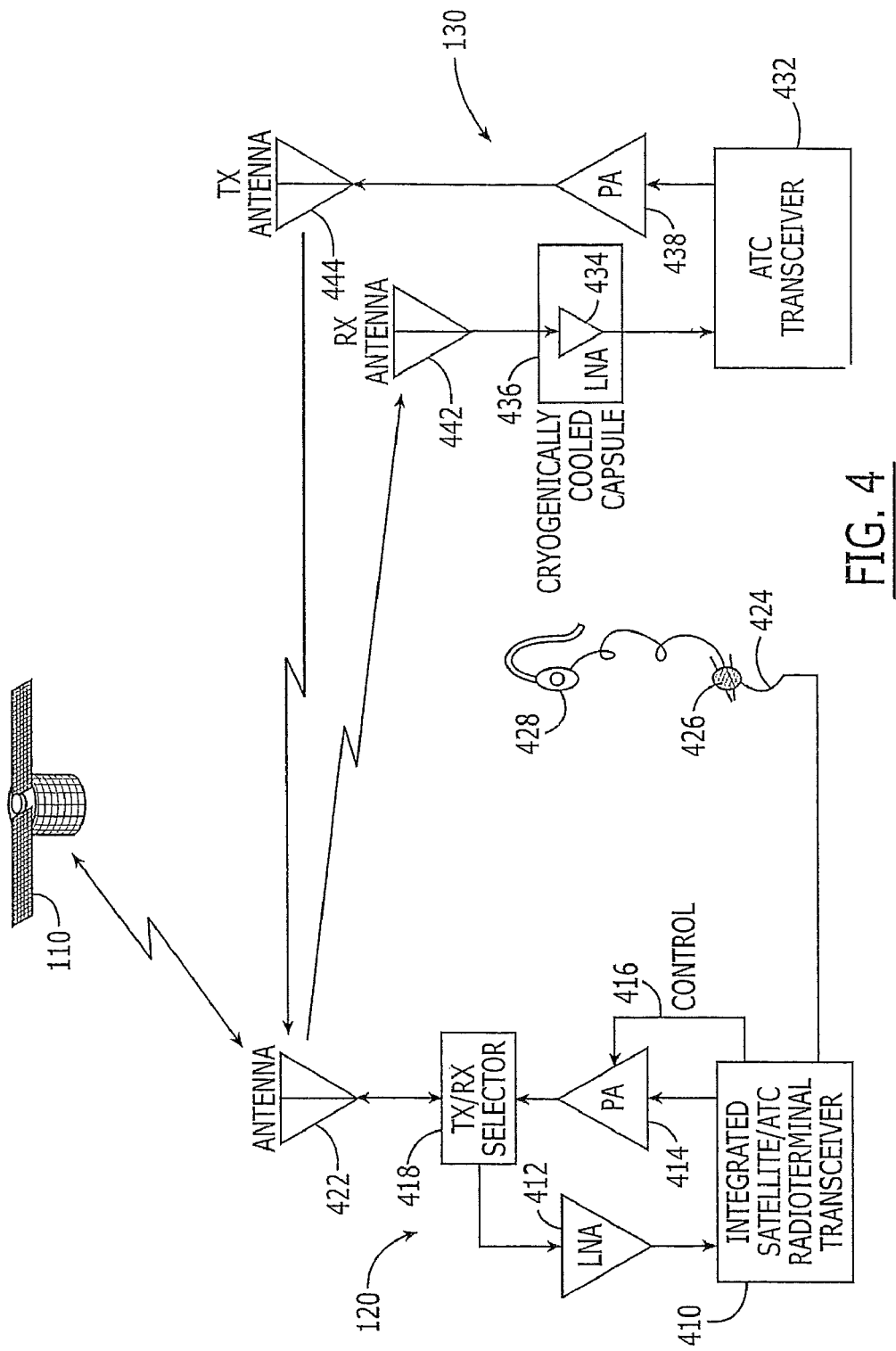
FIG. 4 is a block diagram illustrating communications systems according to embodiments of the present invention.

FIG. 4 is a block diagram of a portion of a radioterminal, such as a radioterminal 120 of FIGS. 1 and 2, and a portion of an ATC, such as an ATC 130 of FIG. 1. Referring to FIG. 4, the radioterminal 120 may include a satellite/ATC radioterminal transceiver 410 which may be integrated in at least some satellite and ATC functionality and may correspond to the transceiver 124 and satellite/hands-free interlock 126 of FIG. 2. A transmit/receive (TX/RX) selector 418 couples a power amplifier 414 or a low noise amplifier 412 to an antenna 422, which may correspond to the antenna 122 of FIG. 2. Thus, the radioterminal 120 may include a single power amplifier 414 and/or a single antenna 422 that is/are sized for communications with the space segment including satellite 110. As such, the radioterminal's power amplifier output level may be limited to less than a maximum value when the radioterminal is communicating with the ATC 130. For example, the power amplifier 414 may be limited to transmit about 200 to 250 mW of maximum power when communicating with a CDMA-based terrestrial system (such as a cdma2000 terrestrial system), and about 600 mW to about one Watt of maximum power when communicating with a GSM-based terrestrial system (where one $mW \equiv 10^{-3}$ Watt). In a satellite mode, the power amplifier 414 may be configured to transmit more than one Watt of maximum power to the satellite 110. In some embodiments, the power amplifier 414 is configured not to output a higher power for space-based network communications unless the control signal 416 is activated. The control signal 416 may not be activated unless the satellite/ATC radioterminal transceiver 410 detects hands-free operation, for example by detecting that a tether 424 is connected to the radioterminal 120, so as to couple a tethered microphone 426 and tethered earpiece 428 to the radioterminal 120.

Still continuing with the description of FIG. 4, at the ATC 130, a power amplifier 438 couples a transmit antenna 444 to an ATC transceiver 432, and a low noise amplifier 434 couples a receive antenna 442 to the ATC transceiver 432. In order to increase the receiver sensitivity of the ATC, the receiver front end electronics, such as the low noise amplifier 434 and/or other elements of the ATC 130 may be cryogenically cooled by encapsulating these elements in a cryogenically cooled capsule 436. The design of cryogenically cooled amplifiers and/or other components is well known to those having skill in the art and need not be described further herein. Cryogenic cooling can increase the available return link margin provided by the ATC for a given radioterminal EIRP and a given configuration of the ATC receiver antenna 442. The increase in available return link margin may be used by the ATC to reduce a radioterminal power and/or EIRP, which can thereby reduce the potential of intra- and/or intersystem interference and also extend a battery life of the radioterminal and/or increase a radius of a service region of the ATC 130.

Cryogenic cooling may also be provided at satellite 110 of a space based network. A transceiver structure of the satellite 110 may be similar to that discussed above with respect to the ATC 130 with a low noise amplifier coupling a satellite receive antenna to a satellite transceiver. To increase the receiver sensitivity of the satellite, the satellite receiver front end electronics, such as the satellite low noise amplifier and/or other elements of the satellite 110 may be cryogenically cooled by encapsulating these elements in a cryogenically cooled capsule at the satellite 110. The design of cryogenically cooled amplifiers and/or other components is well known to those having skill in the art and need not be described further herein. Cryogenic cooling can increase the available return link margin provided by the satellite for a given radioterminal EIRP and a given configuration of the satellite receiver antenna. The increase in available return link margin may be used by the satellite to reduce a radioterminal power and/or EIRP, which can thereby reduce the potential of intra- and/or intersystem interference and extend a battery life of the radioterminal.

Figure 5A:
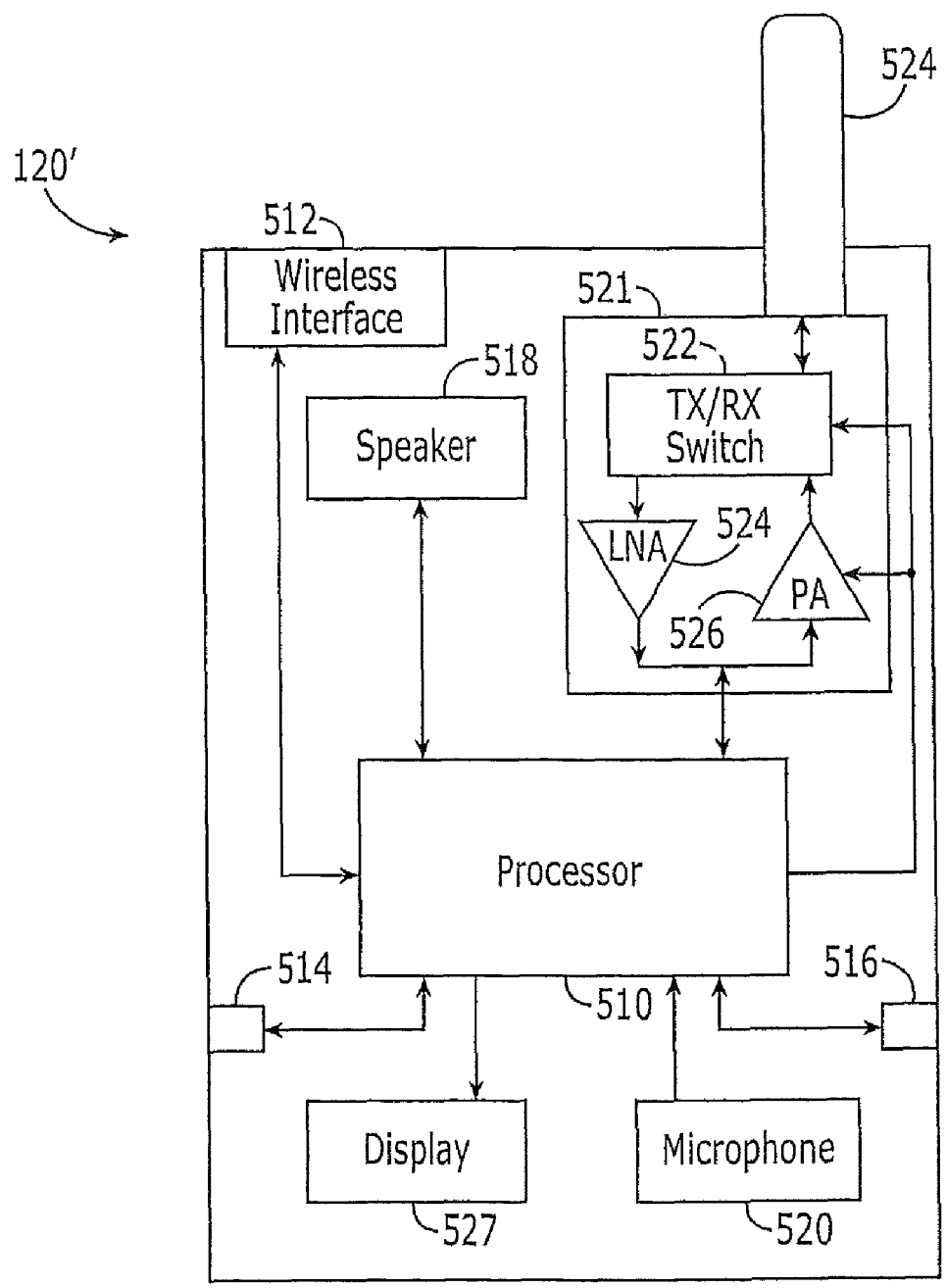
FIGS. 5a and 5b are block diagrams illustrating radioterminals and companion devices according to additional embodiments of the present invention.

FIG. 5a is a block diagram illustrating radioterminals according to still additional embodiments of the present invention. The radioterminal of FIG. 5a may include a processor 510, a wireless interface 512, an accessory jack 514, a companion device jack/interface 516, a speaker 518, a microphone 520, and a transceiver 521, and an antenna 524. More particularly, the transceiver 521 may include a transmit/receive (TX/RX) selector 522, a low noise amplifier 524 for reception, and a power amplifier 526 for transmission. Moreover, the accessory jack 514 may provide a detachable wired coupling for a tether connected to a tethered microphone and a tethered earpiece (such as tether 424, microphone 426, and earpiece 428 illustrated in FIG. 4). In addition or in an alternative, the wireless interface 512 (such as a Bluetooth, WiFi, or other wireless interface) may provide a wireless coupling with a remote microphone and earpiece, for example, using a wireless local area network and/or personal area network such as Bluetooth, WiFi, and/or other network communications techniques. Accordingly, voice communications may be provided in a hand-held mode using built-in speaker 518 and microphone 520, or in a hands-free mode such as using a remote microphone and earpiece (via either accessory jack 514 or wireless interface 512), using a speakerphone interface, using a cradle, and/or using any other hands-free interface.

In still other alternatives discussed in greater detail below with respect to FIG. 5b, voice communications may be provided in a hand-held mode using built-in speaker 518 and microphone 520 and using a transceiver and antenna of a companion device, which may be operative at a distance from the radioterminal, coupled through wireless interface 512 or through a wired companion device jack/interface 516. Accordingly, hand-held voice communications may be provided by the radioterminal 120' with relatively high power transmissions being performed using an amplifier and/or antenna of a companion device remote from the user's head. Accordingly, an interlock function of the processor 510 may block transmissions above a threshold power level (such as transmissions over a return link to satellite 110) using transceiver 521 and antenna 524 unless the radioterminal is operated in a hands-free mode (i.e. using a remote tethered microphone/earpiece, using a remote wireless microphone/earpiece, using a speaker phone mode of operation, using a cradle, and/or using any other conventional tethered or untethered hands-free interface). In addition or in an alternative, an interlock function of the processor 510 may allow voice communications in a hand-held mode using built-in speaker 518 and microphone 520 with transmissions above the threshold (such as transmissions over a return link to satellite 110) being provided using an amplifier and/or antenna of a companion device and/or an antenna and amplifier of the radioterminal, such as antenna 524 and amplifier 526 of the radioterminal, provided that the antenna 524 of the radioterminal and/or one or more radiating element(s) thereof is/are permanently or selectively positioned/configured at an orientation relative to the radioterminal that is at a distance from the radioterminal and/or a user's head when the user is using the radioterminal in a conventional hand-held mode (adjacent to the user's ear).

Figure 5B:
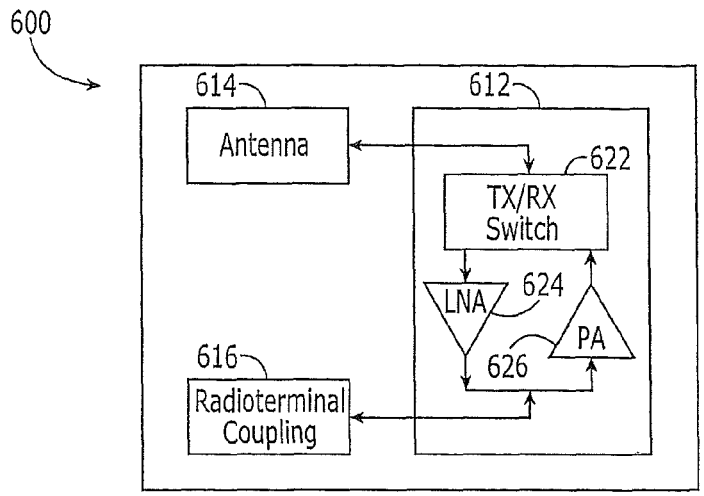

FIG. 5b is a block diagram illustrating a companion device 600 according to embodiments of the present invention. The companion device of FIG. 5b may include a transceiver 612, an antenna 614, and a radioterminal coupling 616. More particularly, the transceiver 612 may include a transmit/receive (TX/RX) selector 622, a low noise amplifier 624 for reception, and a power amplifier 626 for transmission. Moreover, the radiotelephone coupling 616 may provide a wired and/or a wireless coupling with the radioterminal 120'. The radiotelephone coupling 616, for example, may provide a wired coupling with the companion device jack 516 of the radioterminal 120' and/or a wireless coupling with the wireless interface 512, processor 510 and/or the transceiver 521 of the radioterminal 120'. With a power amplifier 626, a low noise amplifier 624, and a transmit/receive switch 622, the companion device 600 may provide both transmit and receive functionalities. The transceiver 612 and/or other element(s) of the companion device 600 may also include other conventional transmit/receive functions (such as modulation, demodulation, error correction encoding/decoding, interleaving, frame formatting, data regeneration and/or filtering functions; not shown in FIG. 5b) that may be required to process signals transmitted and/or received from antenna 614 and/or radioterminal coupling 616. The companion device 600 and radioterminal 120' may be further configured to allow the companion device 600 to be selectively attached to the radioterminal 120' such that the companion device 600 and radioterminal 120' appear as one device and to be selectively detached from the radioterminal 600 such that the companion device 600 and radioterminal 120' appear as two separate devices. The companion device 600 and radioterminal 120' may be further configured to be operatively functional in the attached and/or detached configuration. In some embodiments, the companion device 600 may be configured to provide transmit functionality without providing receive functionality so that the low noise (receive) amplifier 624 and the transmit/receive switch 622 may be omitted from the companion device 600. For example, relatively high power transmissions may be provided using the antenna 614 of the companion device 600 while reception is provided using the built-in antenna 524 and transceiver 521 of the radioterminal 120'.

Accordingly, the radioterminal 120' may provide functionalities as discussed above with respect to FIGS. 1-4. More particularly, interlock operations of the processor 510 may block transmission above a threshold power level (such as transmissions over a return link to satellite 110) using built-in transceiver 521 if the radioterminal is providing voice communications in a hand-held mode using built-in speaker 518 and microphone 520. Interlock operations of the processor 510 may thus allow transmission above the threshold power level using built-in transceiver 521 if the radioterminal is providing voice communications in a hands-free mode, for example, using a tethered remote microphone and earpiece, using a wireless remote microphone and earpiece, using a speakerphone interface, using a cradle, and/or using any other hands-free interface. The threshold power level may be fixed, based on power levels of radiotelephone transmissions for satellite and terrestrial communications or based on a maximum level of power deemed appropriate for transmission adjacent a user's head when the radiotelephone is used in a hand-held mode. In alternatives, the threshold power level may be variable depending on changes in satellite and/or terrestrial power control levels, a length of time the user is on the phone, and/or other factors.

In addition, the interlock operations of the processor 510 may allow voice communications in a hand-held mode using built-in speaker 518 and microphone 520 with transmission above the threshold power level if the companion device 600 is coupled to the radioterminal 120', for example, using wireless interface 512 or using wired companion device jack/interface 516. Transmissions above the threshold power level may thus be provided using the power amplifier 626 and the antenna 614 of the companion device 600 remote from the user's head. The companion device 600 may be a portable device configured to be carried, for example, in a user's pocket, bag, purse, etc. In another alternative, the companion device may be built into an automobile to provide improved communications links when the radioterminal is being used (and possibly shielded) inside the automobile.

According to some embodiments of the present invention, the power amplifier 626 and/or the antenna 614 of the companion device 600 may provide higher gain(s) than the power amplifier 526 and antenna 524 of the radioterminal 120'. By way of example, the antenna 524 of the radiotelephone 120' may provide a gain of approximately −2 dBi, and the antenna 614 of the companion device 600 may provide a gain of approximately +2 dBi to provide a 4 dB increase in gain when transmitting using the companion device 600 as opposed to transmitting using the built-in antenna 524. Furthermore, the companion device antenna 614 may be a substantially Circularly Polarized (CP) antenna and the radioterminal antenna 524 may be a substantially Linearly Polarized (LP) antenna. In addition or in an alternative, the power amplifier 526 of the radioterminal 120' may be a ¼ watt amplifier, and the power amplifier 626 of the companion device 600 may be a 1 watt amplifier to provide a 4 dB increase in gain when transmitting using the companion device 600. Using both the antennas and the power amplifiers discussed above, for example, an increase of 8 dB in gain may be provided when using the companion device for transmission as opposed to using the built-in power amplifier 526 and antenna 524. In general, higher transmission powers and/or higher antenna gains may be provided by the companion device 600 (relative to the radioterminal 120') because the companion device 600 may have fewer size constraints, because the companion device 600 may have fewer power constraints, and/or because the companion device 600 is not intended for use adjacent a user's head.

According to other embodiments of the present invention, the power amplifier 526 of the radioterminal 120' may include a low power mode/power amplifier for relatively low power transmissions below a threshold (such as transmissions to ATC 130), and a high power mode/power amplifier for relatively high power transmissions above a threshold (such as transmissions to the satellite 110). Moreover, interlock operations of the processor 510 may be configured to disable the high power mode/power amplifier when operating in a hand-held mode using built-in speaker 518 and microphone 520 unless the antenna 524 of radioterminal 120' has selectively been positioned substantially in a predetermined second orientation and is not positioned substantially in a predetermined first orientation or in any other orientation/position and/or the radioterminal is being used in a push-to-send (push-to-talk) mode. In accordance with some embodiments, the radioterminal antenna 524 may be selectively positioned in a first predetermined orientation wherein the antenna 524 is maximally pushed-in and/or inserted in the radioterminal 120' so as to maintain a minimal (low) profile and the predetermined second selective orientation is an orientation wherein the antenna 524 is maximally pulled-out of the radioterminal 120' so as to maintain a maximum (high) profile. The radioterminal antenna 524 may be configured with a radiating element (or elements) positioned at substantially an upper section/portion of the antenna so as to maintain a predetermined minimum distance between the radiating element (or elements) and a user's head when the radioterminal antenna 524 is positioned in the predetermined second orientation and the user is using the radioterminal 120' next/adjacent to the head/ear. The radiating element (or elements) of the radioterminal antenna 524 may include a substantially CP radiating element (or elements) and/or a substantially LP radiating element (or elements). Interlock operations of the processor 510 may be configured to enable the high power mode/power amplifier of amplifier 526 of radioterminal 120' when the radioterminal 120' is operating in a mode wherein the antenna 524 of the radioterminal 120' is selectively positioned substantially in the predetermined second orientation and is not positioned substantially in the predetermined first orientation or in any other orientation/position and/or the radioterminal is being used in a push-to-send (push-to-talk) mode and/or in a hands-free mode, for example, using a tethered or untethered earpiece and microphone, using a speaker phone mode, using a cradle, and/or using any other hands-free interface. Accordingly, relatively low power transmissions (below a threshold) using the low power mode/power amplifier of amplifier 526 may be provided when the radioterminal 120' is being used in a non-push-to-send (non-push-to-talk) hand-held mode and the radioterminal antenna 524 is selectively positioned in substantially the first predetermined orientation or relatively low power transmissions (below a threshold) using the low power mode/power amplifier of amplifier 526 may be provided when the radioterminal 120' is being used in a non-push-to-send (non-push-to-talk) hand-held mode and the radioterminal antenna 524 is of the type that is not configured to provide selectivity in orientation and is permanently configured in one orientation that is the same or substantially the same as the first predetermined selective orientation described above. In some embodiments, the radioterminal amplifier 526 is an amplifier that is configured to provide only one power mode, such as, for example, a low power mode that may be used only for low power communications such as, for example, communications with ATC 130. In contrast, relatively high power transmissions (above a threshold) using the high power mode/power amplifier of radioterminal amplifier 526 may be allowed only when operating in a push-to-send (or push-to-talk) mode and/or the radioterminal antenna 524 is selectively positioned in the second predetermined orientation (or the radioterminal antenna 524 is of a type that is configured to be permanently positioned in an orientation that is the same or substantially the same as the second predetermined orientation) and/or the radioterminal is operating in a hands-free mode. More particularly, relatively high power transmissions (above a threshold) using the high power mode/power amplifier of the radioterminal amplifier 526 may be blocked when the radioterminal is operating in a non-speakerphone-enabled hand-held mode and/or the radioterminal antenna 524 is selectively positioned in the first predetermined orientation (or the radioterminal antenna 524 is of a type that is configured to be permanently positioned in an orientation that is the same or substantially the same as the first predetermined orientation).

Accordingly, in order to substantially reduce or eliminate the probability that a user will communicate using the built-in transceiver 521 and antenna 524 at transmission power(s) exceeding a threshold (such as when communicating via the satellite 110) when holding the radioterminal 120' in proximity of the ear, the radioterminal 120' may be configured such that when a relatively high power transmission mode is to be used, the built-in transceiver is rendered unable to substantially transmit a power and/or EIRP that is greater than or equal to a predetermined high power threshold unless a hands-free mode is activated on the radioterminal 120' or the radioterminal 120' is used in a speakerphone mode (i.e., push-to-send or push-to-talk mode or any other speakerphone mode) and/or the radioterminal antenna 524 is selectively positioned in the second predetermined orientation (or the radioterminal antenna 524 is of a type that is configured to be permanently positioned in an orientation that is the same or substantially the same as the second predetermined orientation). A relatively high power transmission mode may thus be used if a hands-free mode is activated, the radioterminal 120' is used in a speakerphone mode (i.e., push-to-send or push-to-talk mode or any other speakerphone mode), the radioterminal antenna 524 is selectively positioned in the second predetermined orientation (or the radioterminal antenna 524 is of a type that is configured to be permanently positioned in an orientation that is the same or substantially the same as the second predetermined orientation) and/or if the companion device 600 is coupled to the radioterminal 120' so that transmission is remote from the radioterminal 120' and remote from the user' head. For example, activation of a hands-free mode, a predetermined selective position/orientation of the radioterminal antenna (or a particular permanent position/orientation of the radioterminal antenna), a speakerphone mode and/or use of the companion device 600 may be required to provide relatively high power (above the threshold) transmissions over a return link, such as, for example a return link to the satellite 110.

According to some embodiments of the present invention, the term hand-held interface may refer to an ear-adjacent interface wherein audio output is provided from a built-in speaker of the radioterminal with the built-in speaker of the radioterminal (and the radioterminal) being placed next/adjacent to the head/ear of the user during communications, and the term hands-free interface may refer to any ear-remote interface allowing the radioterminal to be spaced apart from the head/ear of the user during communications. A hand-held and/or ear adjacent interface, for example, may be provided by a built-in speaker in the radiotelephone providing audio output (corresponding to received wireless communications) at an appropriate volume for use with the built-in speaker and radiotelephone placed next/adjacent to the user's head/ear. A hands-free and/or ear-remote interface, for example, may be any interface allowing use of the radioterminal spaced apart from the user's head/ear during wireless communications. A hands-free and/or ear-remote interface, for example, may include a speakerphone interface and/or an interface for a remote (tethered and/or untethered) earpiece, so that audio output (corresponding to received wireless communications) may be provided without providing the radiotelephone next/adjacent to the user's head/ear during communications. More particularly, a speakerphone interface may include a built-in speaker in the radiotelephone configured to provide audio output (corresponding to received wireless communications) at an appropriate volume for use with the built-in speaker and radiotelephone spaced apart from the users head/ear, and a same built-in speaker may be used for hand-held/ear-adjacent and hands-free/ear-remote interfaces depending on a volume at which it is driven, or different built-in speakers may be used for hand-held/ear-adjacent and hands-free/ear-remote interfaces. Moreover, a speakerphone interface may include an interface for a cradle configured to receive the radioterminal and to couple the radioterminal to a remote loudspeaker; a wireless interface configured to couple the radioterminal to a remote loudspeaker; and/or a built-in speaker (in the radioterminal) configured to provide audio output (corresponding to received wireless communications) at a volume for use with the built-in speaker and radioterminal spaced apart from the user's head/ear, for example, during push-to-talk operations, push-to-transmit operations, and/or walkie-talkie operations. In addition, a hands-free and/or ear-remote interface may include a data interface (such as a display screen) providing a graphic output to be viewed with the radioterminal spaced apart from the user's head/ear.

It will be understood by those having skill in the art that the processor 510 may be a data processor including one or more microprocessors and/or digital signal processors. It will be further understood that the radioterminal 120' may include radio frequency components, man-machine interface components, and/or other conventional components in addition to those components specifically illustrated. Satellite/hands-free/companion-device interlock operations may be provided, at least in part, by a stored program running on the processor 510 that operates in response to man-machine interface components, other interface components, a signal transmitted by the radioterminal 120' and/or a signal received by the radioterminal 120'. Combinations of software and/or other hardware also may be used to implement satellite/hands-free/companion-device interlock operations.

Figure 6:
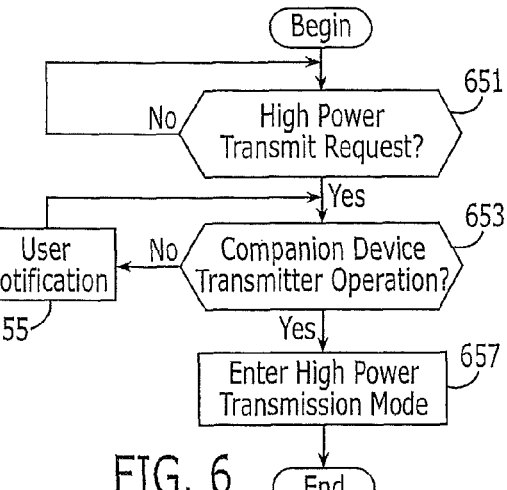
FIGS. 6 and 7 are flow charts illustrating operations of radioterminals according to still additional embodiments of the present invention.

FIG. 6 is a flow chart illustrating operations that may be performed to provide a satellite/hands-free interlock for the radioterminal 120' used with a companion device 600 of FIGS. 5a and 5b according to various embodiments of the present invention. Referring to FIG. 6, a determination may be made at block 651 if there has been a request for high power transmissions, such as transmissions to satellite 110. High power transmissions may refer to transmissions above a threshold power and/or EIRP level. For example, transmissions over a return link to satellite 110 may be at or above the threshold power and/or EIRP level, and transmissions over a return link to ATC 130 may be at or below the threshold power and/or EIRP level. The threshold power and/or EIRP level may be a SAR threshold power and/or EIRP level. According to some embodiments, any request for transmission to a satellite may be a request for high power and/or high EIRP transmissions, and any request for transmissions to an ATC may be a request for low power and/or low EIRP transmissions. According to other embodiments, some requests for transmissions to a relatively distant ATC may be requests for high power and/or high EIRP transmissions. A high power and/or high EIRP transmit request may be based on a user radioterminal request to use the satellite mode; a system request to use the satellite mode; a system request to hand the user radioterminal over from an ATC mode and/or cellular/PCS mode to a satellite mode; a system request to increase transmission power to an ATC and/or cellular/PCS base station (for example, if the radioterminal moves sufficiently far from an ATC); and/or a system and/or user radioterminal request to establish communications using a relatively distant ATC and/or cellular/PCS base station.

If a high power and/or high EIRP transmission mode is requested at block 651, a test may be made as to whether a companion device is available to provide companion device transmitter operations at block 653. Availability of a companion device may be detected by attempting to establish a communications link (for example, using wireless interface 512 and/or companion device jack/interface 516) with the companion device.

If a companion device is available at block 653, then the high power and/or high EIRP transmission mode may be entered at block 657, and the radioterminal may communicate with relatively high power and/or high EIRP transmissions using a power amplifier and/or antenna of a companion device. More particularly, the high power and/or high EIRP transmission mode may be entered at block 657 for communication with satellite 110 though the companion device. In alternatives, the high power and/or high EIRP transmission mode may be entered at block 657 for communication with a relatively distant ATC and/or cellular/PCS base station through the companion device.

Alternately, if a companion device is not detected at block 653, a user notification may be provided at block 655. This user notification may be in the form of an audible signal (for example, using speaker 518) and/or a visual signal (for example, using display 527), and/or using any other type of notification that is perceptible by a human with or without non-human sensory enhancements. User notifications for various other purposes are well known to those having skill in the art, so that the design of the user notification of block 655 need not be described in detail herein.

After user notification, a test may again be made at block 653 as to whether a companion device is available. A user of the radioterminal may then be allowed some period of time to provide coupling with an active companion device before a subsequent test at block 653 to determine if a companion device is available. If a companion device is made available, the high power and/or high EIRP transmission mode may be entered at block 657 so that the radioterminal may communicate with relatively high power and/or high EIRP communications using a power amplifier and/or antenna of the companion device. If the companion device is not made available during the allowed period of time, the request for high power and/or high EIRP transmission may be denied.

Alternately, the test at block 653 may be performed only once, and the request for high power and/or high EIRP transmission may simply be denied if a companion device is not immediately available. In still other embodiments, user notification of block 655 may not be performed, and the request for high power and/or high EIRP transmission may be denied. In yet other embodiments, high power and/or high EIRP transmission may be provided by the radioterminal transceiver 521 for a predetermined interval of time following the request for high power and/or high EIRP transmission when a companion device is not immediately available. During the predetermined interval of time, the user may be notified at least once by the radioterminal to provide a coupling with a companion device and/or to provide a predetermined position/orientation of the radioterminal antenna 524. If a companion device and/or the predetermined position/orientation of the radioterminal antenna is provided within the predetermined interval of time, high power and/or high EIRP transmissions may continue uninterrupted. If a companion device and/or the predetermined position/orientation of the radioterminal antenna is not provided during the predetermined interval of time, high power and/or high EIRP transmission may be interrupted and/or terminated.

Figure 7:
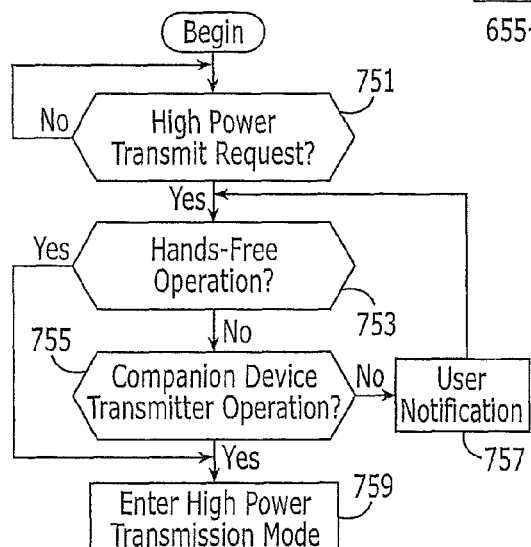

FIG. 7 is a flow chart illustrating operations that may be performed to provide a satellite/hands-free interlock for the radioterminal 120' used with a companion device 600 of FIGS. 5a and 5b according to various additional embodiments of the present invention. Referring to FIG. 7, a determination may be made at block 751 if there has been a request for high power and/or high EIRP transmission, such as a request for transmission to satellite 110. High power and/or high EIRP transmissions may refer to transmissions above a threshold power and/or EIRP level. For example, transmissions over a return link to satellite 110 may be above the threshold power and/or EIRP level, and transmissions over a return link to ATC 130 may be below the threshold power and/or EIRP level. According to some embodiments, any request for transmission to a satellite may be a request for high power and/or high EIRP transmissions, and any request for transmissions to an ATC and/or cellular PCS base station may be a request for low power and/or low EIRP transmissions. According to other embodiments, some requests for transmissions to a relatively distant ATC and/or cellular/PCS base station may be requests for high power and/or high EIRP transmissions. A high power and/or high EIRP transmit request may be based on a user radioterminal request to use the satellite mode; a system request to use the satellite mode; a system request to hand the user radioterminal over from an ATC mode and/or cellular/PCS mode to a satellite mode; a system request to increase transmission power to an ATC (for example, if the radioterminal moves sufficiently far from the ATC); and/or a system and/or user radioterminal request to establish communications using a relatively distant ATC and/or cellular/PCS base station.

If a high power and/or high EIRP transmission mode is requested at block 751, a test may be made as to whether hands-free operation of the radioterminal is active at block 753. Hands-free operation may be detected at block 753, for example, by detecting that a tethered microphone and earpiece have been inserted into an appropriate jack/interface of the radioterminal, by detecting that a wired and/or wireless local area network (and/or personal area network) connection has been made and/or using other techniques for detecting use of a hands-free interface. If hands-free operation is detected at block 753, then a high power and/or high EIRP transmission mode may be entered at block 759 with high power and/or high EIRP transmission being provided using a built-in transceiver and antenna of the radioterminal.

If hands-free operation is not detected at block 753, a test may be made as to whether a companion device is available to provide companion device transmitter operations at block 755. Availability of a companion device may be detected by attempting to establish a communications link (for example, using wireless interface 512 and/or companion device jack/interface 516) with the companion device.

If a companion device is available at block 755, then the high power and/or high EIRP transmission mode may be entered at block 759 so that the radioterminal may communicate with relatively high power and/or high EIRP transmissions using a power amplifier and/or antenna of the companion device. More particularly, the high power and/or high EIRP transmission mode may be entered at block 759 for communication with, for example, satellite 110 though the companion device. In alternatives, the high power and/or high EIRP transmission mode may be entered at block 759 for communication with a relatively distant ATC and/or cellular/PCS base station through the companion device.

Alternately, if hands-free operation is not detected at block 753 and a companion device is not detected at block 755, a user notification may be provided at block 757. The user notification may also be provided at block 757 in response to not detecting a hands-free operation at block 753 and before attempting to detect a companion device at block 755 (or concurrently with attempting to detect a companion device at block 755). This user notification may be in the form of an audible signal (for example, using speaker 518 and/or any other radioterminal component that may produce an audible signal) and/or a visual signal (for example, using display 527), and/or using any other type of notification that is perceptible by a human with or without non-human sensory enhancements. User notifications for various other purposes are well known to those having skill in the art, so that the design of the user notification of block 757 need not be described in detail herein.

After user notification and a delay, tests may again be made at blocks 753 and 755 as to whether hands-free operation and/or a companion device is/are detected. A user of the radioterminal may thus be allowed some period of time to provide hands-free operation and/or to provide a companion device before a subsequent test(s) is/are made at block 753 and/or 755 to determine whether hands-free operation and/or a companion device is detected. If hands-free operation and/or a companion device is made available, the high power and/or high EIRP transmission mode may be entered at block 659 so that the radioterminal may communicate with relatively high power and/or high EIRP transmissions using a built-in transceiver and antenna in a hands-free mode of operation and/or using a power amplifier and/or antenna of the companion device in a hands-free or hand-held mode of operation. If a hands-free mode of operation or a companion device is not made available during an allowed and/or predetermined period of time, the request for high power and/or high EIRP transmission may be denied. In some embodiments, the allowed and/or predetermined period of time may be a priori programmed into the radioterminal, may be determined by the system and transmitted to the radioterminal and/or may depend on a power and/or EIRP level of the radioterminal.

Alternately, the tests at blocks 753 and/or 755 may be performed only once, and the request for high power and/or high EIRP transmission may simply be denied if hands-free operation and/or a companion device is not immediately available. In still other embodiments, user notification of block 757 may not be performed, and the request for high power and/or high EIRP transmission may be denied. In yet other embodiments, high power and/or high EIRP transmission may be provided by the radioterminal transceiver 521 for an interval of time following the request for high power and/or high EIRP transmission even though neither hands-free operation or a companion device is available. During the interval of time, the user may be notified at least once by the radioterminal to provide hands-free operation and/or a coupling with a companion device. If hands-free operation and/or a companion device is provided within the interval of time, high power and/or high EIRP transmissions may continue uninterrupted. If hands-free operation and/or a companion device is not provided during the interval of time, high power and/or high EIRP transmission may be interrupted and/or terminated.

While the flow chart of FIG. 7 shows that a test to detect hands-free operation at block 753 may precede a test to detect a companion device at block 755, an order of these tests may be reversed and/or the tests may be performed at substantially the same time. For example, both tests may be performed consecutively or at substantially the same time, and if the radioterminal is operating in a hands-free mode of operation and a companion device is available, the radioterminal may enter a high power and/or high EIRP transmission mode at block 759 using either a built-in transceiver and antenna and/or a power amplifier and antenna of the companion device. For example, the radioterminal may preferentially select to use the power amplifier and antenna of the companion device because a higher power and/or EIRP may be available. If a high power and/or high EIRP transmission mode is initially entered at block 759 using a built-in transceiver and antenna with the radioterminal being operated in a hands-free mode, the radioterminal may subsequently switch to a high power and/or high EIRP transmission mode using a power amplifier and antenna of a companion device when the companion device is subsequently coupled (either wired or wirelessly) with the radioterminal or the radioterminal may continue to use the built-in transceiver 521 and antenna 524 of the radioterminal and the transceiver 612 and antenna 614 of the companion device.

Moreover, separate notification operations may be provided if either hands-free operation is not available at block 753 and/or if companion device transmitter operation is not available at block 755. For example, user notification may be provided if hands-free operation is not available at block 753 before determining if companion device transmitter operation is available at block 755, and a second user notification may be provided at block 757 if companion device transmitter operation is not available. Separate user notification operations may be similarly provided if an order of operations of blocks 755 and 757 is reversed and/or provided simultaneously.

In other embodiments, hands-free operation of a radioterminal and/or operation of a companion device may not be necessary and the flow chart of FIG. 6 and/or FIG. 7 may not be used if the radioterminal is configured to operate in speakerphone mode (i.e., walkie-talkie mode, push-to-talk mode and/or any other mode that does not allow or require the user to operate the radioterminal adjacent to an ear) when communicating at a power and/or EIRP level that exceeds or equals a threshold.

In further embodiments, hands-free operation of a radioterminal and/or operation of a companion device may not be necessary and the flow chart of FIG. 6 and/or FIG. 7 may not be used if the radioterminal is configured with an appropriately positioned/oriented antenna (that is either permanently appropriately positioned/oriented or configured to be appropriately positioned/oriented selectively by a user of the radioterminal) that maintains a minimum distance between a radiating element (or elements) of the antenna and the user's head when the user is communicating with the radioterminal adjacent to an ear. It will be understood that a radioterminal that is configured with an antenna that may be appropriately selectively positioned/oriented by a user may provide a notification to the user, by using a flow chart technique/methodology similar to that illustrated in FIG. 6 and/or FIG. 7, to notify the user of a communications mode of the radioterminal that requires an appropriately selectively positioned/oriented antenna state if the antenna of the radioterminal is not substantially appropriately positioned/oriented in the appropriate position/orientation state that is required by the communications mode of the radioterminal. In an alternate or in addition to providing a notification to the user of the radioterminal of a communications mode of the radioterminal that requires an appropriately selectively positioned/oriented antenna state if the antenna of the radioterminal is not substantially appropriately positioned/oriented in the appropriate position/orientation state that is required by the communications mode of the radioterminal a notification may also be provided to the user to configure the hand-held interface of the radioterminal in speakerphone mode and/or push-to-talk mode thereby increasing a distance between an antenna radiating element of the antenna of the radioterminal and the user's head.

In some embodiments, the radioterminal may comprise a plurality of vocoder transmission rates one of which may be selected and used to provide voice communications and/or a plurality of data transmission rates one of which may be selected and used to provide data communications and the radioterminal may be configured to preferentially select and use a vocoder transmission rate and/or a data transmission rate that is low (or the lowest) compared to the other vocoder and/or data transmission rates included in the radioterminal when the radioterminal is providing space-based communications and/or terrestrial communications to thereby reduce a power and/or EIPR level that the radioterminal uses to provide the space-based and/or terrestrial communications. The vocoder and/or data transmission rate that the radioterminal receives from an ATC and/or a space-based component may be higher than the vocoder and/or data transmission rate that the radioterminal transmits to the ATC and/or the space-based component.

In some embodiments, the transceiver of the radioterminal comprises a Power Amplifier (PA) that is configured to provide a first maximum output power level when the radioterminal is providing terrestrial communications and a second maximum output power level when the radioterminal is providing space-based communications. In some embodiments the second maximum output power level is greater than the first maximum output power level. In other embodiments, the transceiver of the radioterminal may be configured with a plurality of power amplifiers corresponding to a respective plurality of maximum output power levels and/or frequency bands that the radioterminal uses to provide terrestrial and/or space-based communications.

The transceiver of the radioterminal may be configured with one Low Noise Amplifier (LNA) that is used by the radioterminal to receive terrestrial and space-based communications or the transceiver of the radioterminal may comprise first and second LNAs wherein the first LNA is used by the radioterminal to receive terrestrial communications and the second LNA is used by the radioterminal to receive space-based communications. In some embodiments, a Noise Figure (NF) of the transceiver of the radioterminal is at a lower value (dB) when the transceiver of the radioterminal is providing space-based communications compared to a NF of the transceiver of the radioterminal when the radioterminal is providing terrestrial communications.

In further embodiments, one or more antenna element(s) of the radioterminal is/are configured to transmit communications to an ATC and/or to a space-based component using substantially Circularly Polarized (CP) and/or Linearly Polarized (LP) electro-magnetic energy and the ATC and/or the space-based component is/are configured to transmit communications to the radioterminal using substantially CP and/or LP electromagnetic energy and one or more radioterminal antenna element(s) is/are configured to receive and process the CP and/or the LP electromagnetic energy that is transmitted from the ATC and/or the space-based component and received at the radioterminal.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A hand-held radioterminal comprising:
   a transceiver that is configured for space-based communications and for terrestrial wireless communications;
   an antenna that is selectively configurable in at least a low profile position and/or orientation and a high profile position and/or orientation, wherein the low profile position and/or orientation of the antenna is different than the high profile position and/or orientation of the antenna; and
   a satellite interlock that is configured to prevent the transceiver from transmitting communications at a high power and/or EIRP that is greater than or equal to a threshold responsive to the antenna being configured in the low profile position and/or orientation, to allow the transceiver to transmit communications at the high power and/or EIRP responsive to the antenna being configured in the high profile position and/or orientation, and to allow the transceiver to transmit communications at a low power and/or EIRP that is less than or equal to a threshold independent of the antenna's position and/or orientation.

2. A hand-held radioterminal according to claim 1 wherein the high profile position and/or orientation of the antenna maintains a distance from the radioterminal and/or a user's head that is greater than a distance maintained by the low profile position and/or orientation of the antenna from the radioterminal and/or the user's head.

3. A hand-held radioterminal according to claim 1 further comprising:
   a hand-held interface;
   wherein a radiating element of the antenna is positioned at a first distance from the hand-held interface in the low profile position and/or orientation of the antenna, and wherein the radiating element of the antenna is positioned at a second distance from the hand-held interface in the high profile position and/or orientation of the antenna, wherein the second distance is greater than the first distance.

4. A hand-held radioterminal according to claim 3 wherein the hand-held interface comprises a built-in speaker configured to provide audio output corresponding to wireless communications received by the transceiver in a next to the user's ear mode when the hand-held interface is activated.

5. A hand-held radioterminal according to claim 4 wherein the antenna is pushed-in and/or inserted in the hand-held radioterminal when in the low profile position and/or orientation, and wherein the antenna is pulled-out of the hand-held radioterminal when in the high profile position and/or orientation.

6. A hand-held radioterminal according to claim 1 wherein the antenna is pushed-in and/or inserted in the hand-held radioterminal when in the low profile position and/or orientation, and wherein the antenna is pulled-out of the hand-held radioterminal when in the high profile position and/or orientation.

* * * * *